US006966734B2

(12) United States Patent
Toteff

(10) Patent No.: US 6,966,734 B2
(45) Date of Patent: Nov. 22, 2005

(54) DUAL PURPOSE TRACK FOR HOLDING WHEEL CHOCKS AND STRAP CLIPS TO TIE DOWN DIRT BIKES TO TRAILERS

(76) Inventor: Thomas S. Toteff, 2840 Hosner, Oxford, MI (US) 48370

( * ) Notice: Subject to any disclaimer, the term of this patent is extended or adjusted under 35 U.S.C. 154(b) by 15 days.

(21) Appl. No.: 10/831,574

(22) Filed: Apr. 23, 2004

(65) Prior Publication Data

US 2005/0238455 A1 Oct. 27, 2005

(51) Int. Cl.[7] .................................................. B60P 7/08

(52) U.S. Cl. ............................ 410/8; 410/711; 410/30; 410/104; 410/105; 410/115

(58) Field of Search ................................ 410/7–12, 23, 410/30, 110, 116, 104–106, 115; 24/265 CD; 224/537, 571, 924; 248/499; 188/32

(56) References Cited

U.S. PATENT DOCUMENTS

| | | | | |
|---|---|---|---|---|
| 3,605,637 A | | 9/1971 | Prete, Jr. | |
| 4,026,218 A | | 5/1977 | Prete, Jr. et al. | |
| 4,277,043 A | | 7/1981 | Weik | |
| 4,376,522 A | | 3/1983 | Banks | |
| 4,850,769 A | | 7/1989 | Matthews | |
| 4,867,623 A | | 9/1989 | Loyd | |
| 5,265,992 A | | 11/1993 | Jensen | |
| 5,609,452 A | | 3/1997 | Looker et al. | |
| 5,752,791 A | | 5/1998 | Ehrlich | |
| 5,765,978 A | | 6/1998 | Looker et al. | |
| 6,099,219 A | * | 8/2000 | Bartholomay | 410/20 |
| 6,171,037 B1 | * | 1/2001 | Andre | 410/20 |
| 6,331,094 B1 | * | 12/2001 | Burrows | 410/30 |
| 6,799,927 B2 | * | 10/2004 | Wheatley | 410/104 |
| 6,863,481 B2 | * | 3/2005 | Pingel | 410/30 |

* cited by examiner

*Primary Examiner*—Stephen Gordon
(74) *Attorney, Agent, or Firm*—Dykema Gossett PLLC

(57) ABSTRACT

The dual purpose track comprises a unitary elongated body having a longitudinal axis and a raised center section extending along the axis from one end to the other. The center section includes a flat base with downwardly tapering sides terminating in laterally outwardly extending flanges. The flat base which extends along the longitudinal axis is provided with longitudinally spaced apart elongated slots, as an example, spaced every four inches, which extend lengthwise along the axis. Each slot is configured to receive either the head of the bolt of a wheel chock used to retain a dirt bike along the floor of a trailer or a tie down fastening device. A strap is connected between the tie down device and the handle bar of the dirt bike to assist in retaining the bike in a fixed position. Thus, the track serves two purposes, namely, it holds the wheel chocks and the anchoring devices for the straps.

17 Claims, 8 Drawing Sheets

DUAL PURPOSE TRACK FOR HOLDING WHEEL CHOCKS AND STRAP CLIPS TO TIE DOWN DIRT BIKES TO TRAILERS

BACKGROUND OF THE INVENTION

1. Field of the Invention

This invention relates to securement devices, primarily for open or closed trailers pulled by trucks or vehicles in transporting and stabilizing, as an example, dirt bikes or other cargo.

2. Description of the Prior Art

The prior art illustrates various securement devices for removeably securing cargo or a load on one or more tracks at preselected positions along the track. Such devices are used in open trailers, open trucks, closed trucks and aircrafts, to name a few vehicles. One prior art device is illustrated in FIGS. 8 and 9 of the patent drawings. The track includes a unitary body having a longitudinal axis including a raised center portion and a pair of laterally outwardly extending flanges which extend lengthwise parallel to the longitudinal axis. The track has in the center portion longitudinally spaced, transversely extending slots which are adapted to receive anchoring clips. This prior art device has utility in certain applications but is not useful to tie down various vehicles or dirt bikes having tires on open trailers or in enclosed vehicles. Currently the wheel chock is positioned around the tire of the dirt bike and is held or fastened by bolts directly to the wood floor of the trailer. It is extremely difficult to securely tie a number of dirt bikes on the wood floor of the trailer. This is particularly true when you have different size dirt bikes and when it is necessary to change bikes. This procedure could take hours to reset the wheel chocks and to tie or secure the dirt bikes to the floor of the trailer. The novel track of the present invention permits the dirt bikes to be mounted rapidly and expeditiously on the floor of the trailer to which the track is mounted and to be quickly removed for use.

As with the tracks of the present invention, the tracks of the prior art may be mounted either horizontally or vertically and used with various anchor fittings for removeably attaching objects to the floor or wall of the vehicle or garage. Such devices are described, for example, in the following patents: Prete Jr., U.S. Pat. No. 3,605,637, Sep. 20, 1971 entitled "Anchor Fitting for Securing Loads to a Retainer Track"; Prete, et. al., U.S. Pat. No. 4,026,218, May 31, 1977 entitled "Rattle Proof Anchor Fitting for Securing Loads to a Retainer Track"; Weik, U.S. Pat. No. 4,277,043, Jul. 7, 1981 entitled "Locking Assembly for Aircraft Seat"; Banks, U.S. Pat. No. 4,376,522, Mar. 15, 1983 entitled "Aircraft Seat"; Matthews, U.S. Pat. No. 4,850,769, Jul. 25, 1989 entitled "Tie-Down Device"; Loyd, U.S. Pat. No. 4,867,623, Sep. 19, 1989 entitled "Ring Fitting for Dunnage Track"; Jensen, U.S. Pat. No. 5,256,992, Nov. 30, 1993 entitled "Tie Down Fitting for Retaining Objects to the Floor or Side Wall of a Vehicle"; Looker et. al., U.S. Pat. No. 5,609,452, Mar. 11, 1997 entitled "Cargo Track Fitting"; Ehrlich, U.S. Pat. No. 5,752,791, May 19, 1998 entitled "Cargo Securement Assembly"; and Looker et al, U.S. Pat. No. 5,765,978, Jun. 16, 1998 entitled "Cargo Tracking Fitting". Various types of prior art slotted tracks of different configurations are disclosed. Some structures comprise an elongated track member having spaced notches or slots formed therein. Various types of anchor fittings have been developed to fit in the track structures. The prior art devices while providing good retaining action in the track, generally lack the ease and rapidity of installation required for rapidly storing and removing cargo such as dirt bikes from the trailer.

SUMMARY OF THE PRESENT INVENTION

It is a feature of the present invention to provide a track having a unitary elongated body having a longitudinal axis, with the body having a raised center section extending along the longitudinal axis from one end of the body to the other end. With such a construction, the center section has a flat face with downwardly tapering sides terminating in laterally outwardly extending flanges extending parallel to and spaced from the longitudinal axis from one end of the body to the other end.

It is a further feature of the present invention to provide a track where the flat face of the raised center section has a plurality of uniquely configured longitudinally spaced apart slots extending lengthwise along the longitudinal axis, with each slot having a pair of longitudinally extending first side walls which are spaced laterally apart, with the first side walls of each slot being connected to a first end and a second end with parallel end walls. With such a construction, an entrance opening of arcuate configuration enlarges the slot between the first and second parallel end walls. A slot extension intersects the second end wall and extends lengthwise along the longitudinal axis and is provided with a pair of parallel longitudinally extending second side walls terminating in a third end wall which is spaced from the first and second end walls.

Another feature of the present invention is to provide a pair of parallel tracks of the aforementioned type, and a wheel chock having a pair of tubular spaced apart sides connected at the top and terminating in a pair of spaced apart legs which overlie the parallel tracks. Each leg has a threaded bolt extending therethrough, with each bolt having a head on one end and a nut on the threaded end with each head extending into a slot of the track through the arcuate entrance opening and then moved into the corresponding slot extension where the bolt engages the pair of parallel longitudinally extending second side walls and the corresponding third end wall.

Still another feature of the present invention is to provide a combination of a track of the aforementioned type and a threaded bolt having on one end a head adapted to fit within the slot extension of one of the slots and on the other end a hook to which a rope or line may be connected.

A further feature of the present invention is to provide a track of the aforementioned type which may be mounted either horizontally or vertically along the floor or wall of a truck, garage or anywhere else a track may be utilized to tie down objects or cargo such as dirt bikes, tractors, automobiles, engines or any other type of load with the assistance of fastening devices includes wheel chocks, nuts and bolts, tie down loops, straps and the like.

A still further feature of the present invention to provide an economical yet highly reliable method for securing cargo of different types in place.

Finally, it is a feature of the present invention is to provide a novel tie down arrangement and track assembly that is relativity inexpensive to manufacturer, that may be readily installed on a trailer, in a truck, or at home without special tools or knowledge except for possibly a screw driver.

Other features and advantages of the present invention will become apparent from the following portion of the specification and from the accompanying drawings which illustrate, in accordance with the mandate of the patent statutes, a presently preferred embodiment incorporating the principles of the invention.

BRIEF DESCRIPTION OF A PREFERRED EMBODIMENT

Briefly described, the invention includes a novel track and an anchoring device which may be a wheel chock along with a nut and bolt, a tie down device with an anchoring clip and strap and other fastening devices, bolts, and the like. The track comprises a unitary elongated body having a longitudinal axis. The body has a raised center section extending along the longitudinal axis from one end to the other end. The center section has a flat base with downwardly tapering sides terminating in laterally outwardly extending flanges extending parallel to and being spaced from the longitudinal axis from one of the body to the other end. The flat base of the raised center section has a plurality of longitudinally spaced apart slots extending lengthwise along the longitudinal axis. Each slot has a pair of longitudinally extending first side walls which are spaced laterally apart. The first side walls of each slot are connected by first and second parallel end walls. An entrance opening of arcuate configuration enlarges the slot between the first and second parallel end walls. A slot extension intersects the second end wall and extends lengthwise along the longitudinal axis. The slot extension has a pair of parallel longitudinally extending second side walls terminating in a third end wall which is spaced from the first and second end walls.

Figure 1:
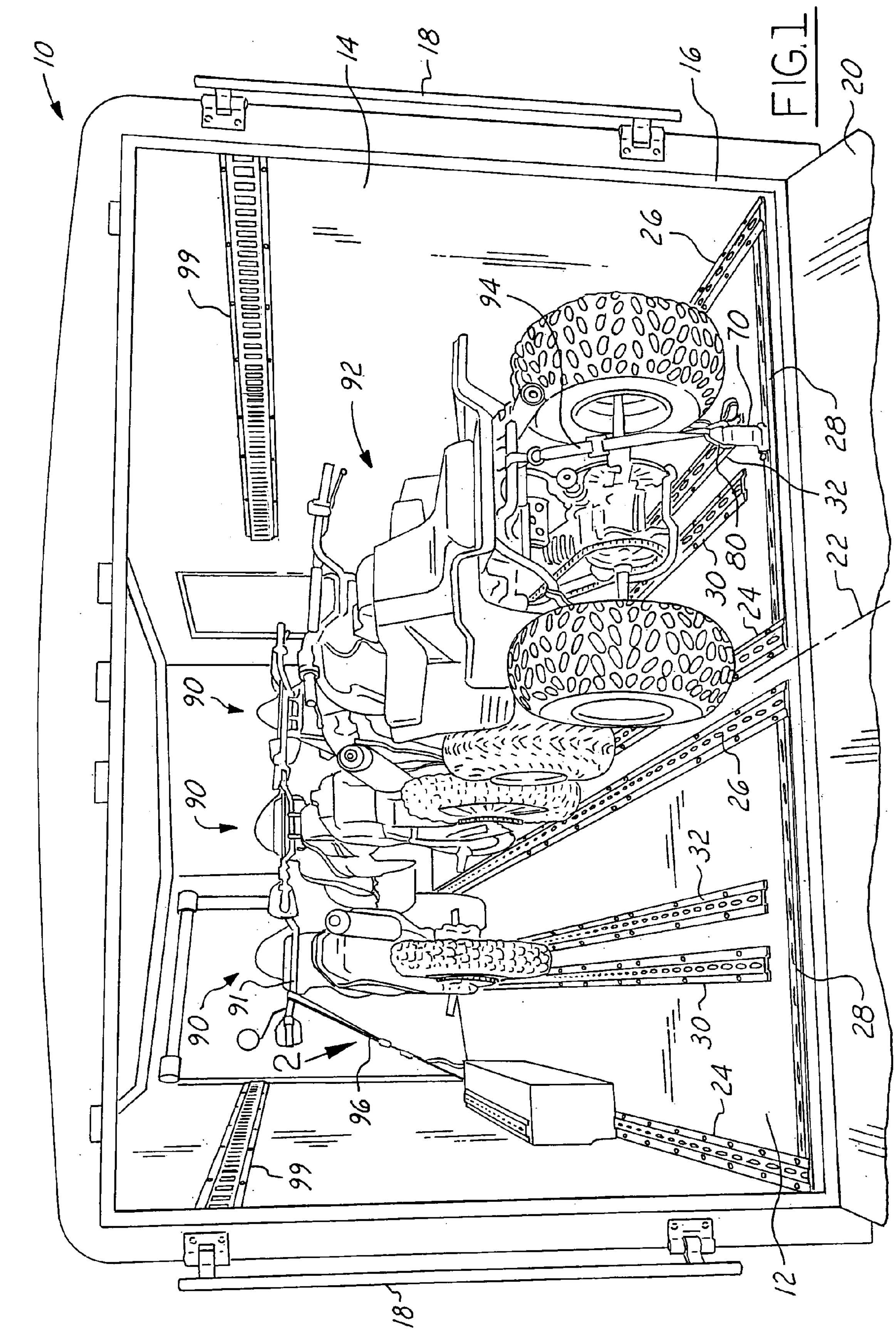
FIG. 1 is a perspective view of a truck or trailer, with the rear doors open so as to illustrate the mounting of the tracks on the trailer floor lengthwise in the trailer and in a predetermined spaced apart relationship to provide the means to which the 4-wheelers and other cargo may be mounted in the truck or trailer and tied down to one or more of the tracks to hold the 4-wheelers or cargo in place.
Figure 2:
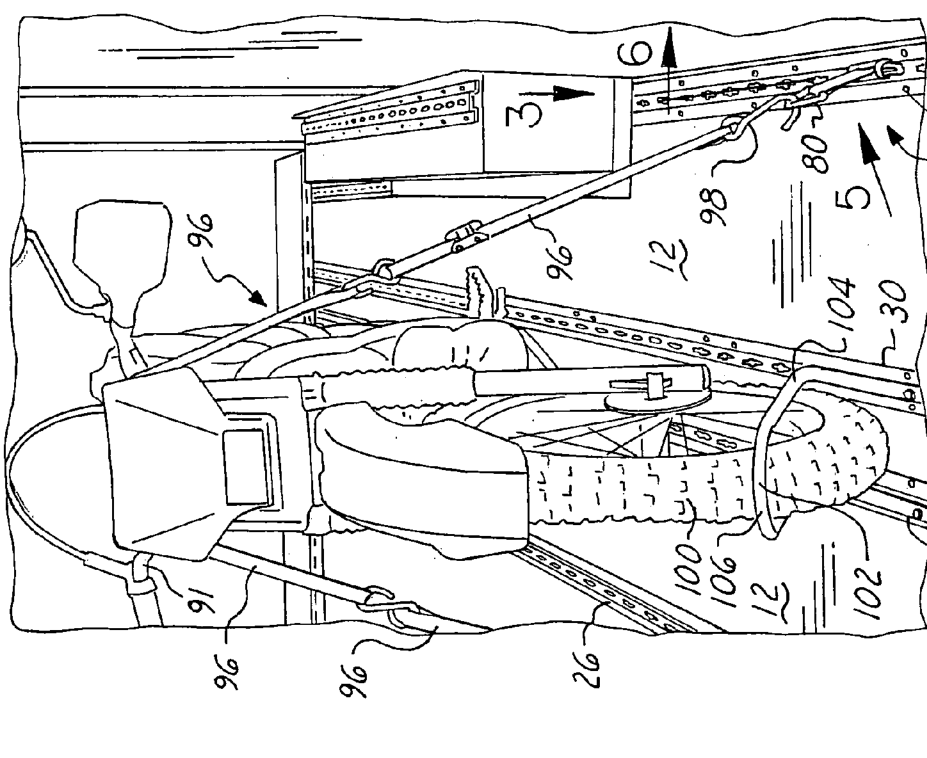
FIG. 2 is a fragmentary perspective view looking in the direction of arrow 2 of FIG. 1 and illustrating a dirt bikes retained in the trailer and secured in place via a wheel chock and a pair of straps anchored to retainer straps carried by the tracks.

Referring now to FIGS. 1 and 2, there is illustrated a closed trailer 10 which may be pulled by a truck or other vehicle. The trailer 10 has suitable openings at the front and at the rear of the trailer 10. The trailer includes a floor 12 and side walls 14. The rear or back 16 of the trailer 10 may be closed by a pair of swingable doors 18, illustrated in an open position. A loading ramp or gate 20 is provided which also forms a part of the trailer 10.

A plurality of novel tracks is mounted lengthwise on the trailer 10 as well as across the rear of the trailer 10 as illustrated in FIG. 1. The tracks are spaced apart according to a predetermined pattern in order to suitably anchor the vehicles and dirt bikes thereto. The trailer 10 has a longitudinal center line 22. On opposite sides of the center line are the novel tracks including the longitudinally extending tracks 24 and 26 which have the rear ends connected by the laterally extending track 28. Located between the tracks 24 and 26 are a pair of parallel relatively close longitudinally extending tracks 30 and 32. Each track is tied down or mounted on the floor 12 of the vehicle or trailer 10 by moveable screws and/or bolts, not shown.

Each novel track may be of one or a different length, as an example, from four feet to eight feet in length or longer. The track may be cut into smaller pieces to fit different locations and to serve different purposes.

Figure 3:
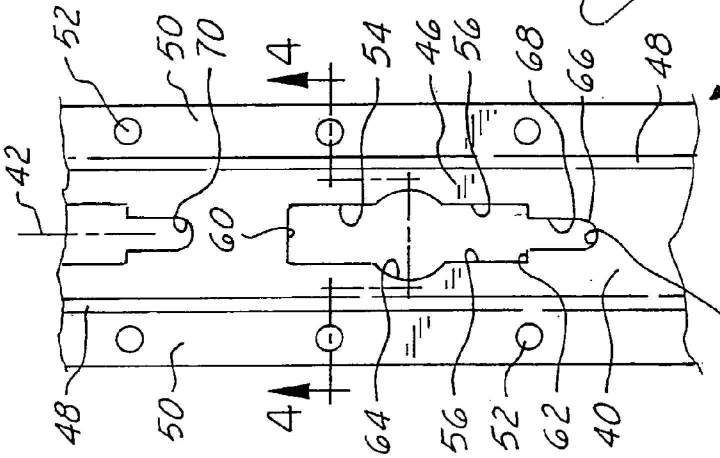
FIG. 3 is a fragmentary top view of the novel track looking in the direction of arrow 3 of FIG. 2, which parts are broken away.
Figure 4:
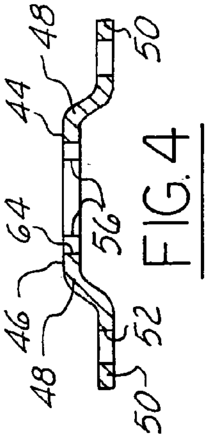
FIG. 4 is a sectional view through the track taken on the line 4—4 of FIG. 3 and illustrating the raised center section, tapered sides and laterally extending flanges.

Referring now to FIGS. 3 and 4, each track comprises a unitary elongated body 40 having a longitudinal axis 42. The body 40 has a raised center section 44 extending along the longitudinal axis 42 from one end of the body 40 to the other end. The raised center section 44 has a flat base 46 with the terminal edges thereof having downwardly tapering sides 48 terminating in laterally outwardly extending flanges 50. The flanges 50 are provided with longitudinally spaced apart anchoring holes or openings 52 which may be selectively used to secure the track to the floor 12 of the trailer 10. The base 46 of the raised center section 44 is provided with a plurality of longitudinally spaced apart slots 54 which extend lengthwise along the longitudinal axis 42. Each slot 54 has a pair of longitudinally extending first side walls 56 which are spaced laterally apart. Each of the first side walls 56 and slot 54 is connected by first and second end walls 60 and 62. Midway between the end walls 60 and 62 is provided an arcuate entrance opening 64 which enlarges a portion of the slot 54 between the end walls 60 and 62. The slot 54 commencing at the second end wall 62 is provided with a slot extension 66 which intersects the second end wall 62 and extends lengthwise along the axis 42 away from the end walls 60 and 62. The slot extension 66 includes a pair of parallel longitudinally extending second side walls 68 which terminate in a third end wall 70 which is of arcuate configuration as best illustrated in FIG. 3.

The novel track is made from a strong metal such as steel. Each track has a width of 3⅛ inches with the raised center section as measured from the bottom of the flanges 50 to the flat base 46 of the center section having a height of ½ inch. The fastening holes 52 of each flange 50 is spaced inwardly from the end of the track a distance of approximately ¾ of an inch. Thereafter the holes 52 are spaced longitudinally apart, as an example, on two inch centerlines. Each of the slots 54 of each track has a length of three inches measured from the first end wall 60 to the third end wall 70, with the longitudinally extending, laterally spaced first side walls 56 being spaced apart ½ inch while the longitudinally extending, laterally spaced second side walls are spaced apart approximately 5⁄16 inch. The entrance opening 64 is formed on a ¾ inch diameter. Finally, the spacing between the first end wall 60 of one slot 54 and the third end wall 70 of the adjacent slot is ⅞ inch apart. The plurality of longitudinally spaced apart slots 56 are identical. The entrance opening 64 of each slot 56 is generally located midway between the first and second parallel end walls 60 and 62.

Figure 5:
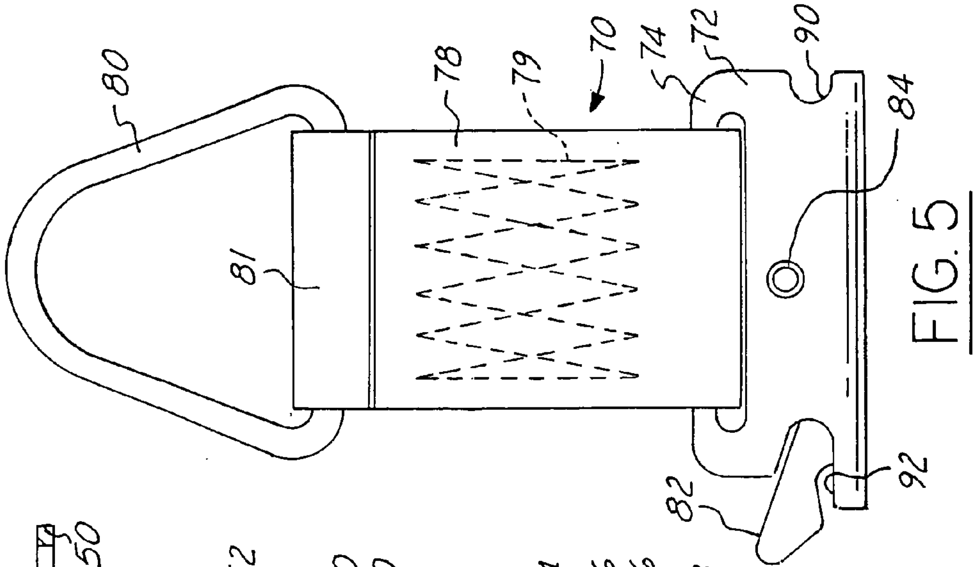
FIG. 5 is a perspective view of a retainer and strap assembly usable with the novel track of FIG. 3.
Figure 6:
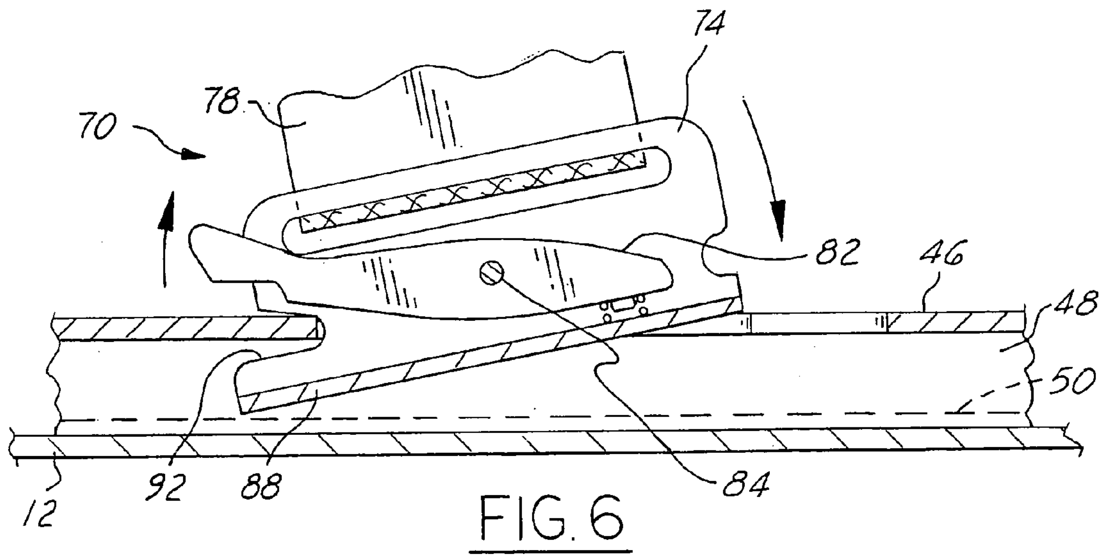
FIG. 6 is a sectional view taken along the lines 6—6 of FIG. 2 and illustrating the manner in which the retainer and strap assembly is inserted into the elongated slot of the track of FIG. 3.
Figure 7:
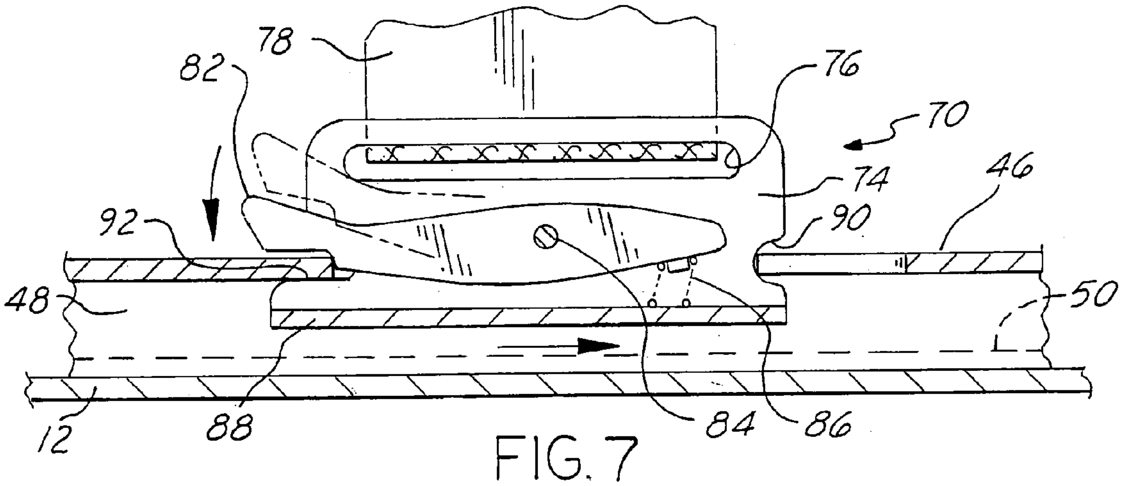
FIG. 7 is a view similar to FIG. 6 but illustrating the retainer and strap assembly in a fixed and retained position in the track of FIG. 3.

The fastening device and strap 70 illustrated in FIGS. 5–7 inclusive includes a U-shaped body 72 having upstanding flanges 74 which are spaced laterally apart.

The flanges 74 have aligned slots 76 near the upper edges through which a strap 78 extends. The strap 78 is stitched at 79 and secured to the body 72. The other end of the strap 78 is provided with an anchoring loop 80 which extends through a tubular sleeve 81 provided at the end of strap 78. Located between the spaced apart flanges 74 of fastening device 70 is a clasp or catch 82 which is pivotally mounted on a pivot 84 which extends through the flanges 74 as illustrated in FIGS. 5–7. The catch or latch 82 is biased by a spring 86. The U-shaped body 72 has a bottom wall 88. The flanges 74 are cut away at the forward end at 90 and at the trailing end at 92 to provide for entering the fastening device 70 into the slot 54 of the track as illustrated in FIGS. 6 and 7. The trailing end 92, with the latch raised as in FIG. 6, fits under the bottom surfaces of the area surrounding the second side walls until the leading end 90 clears the first end wall 60. Thus, both ends 90, 92 are anchored in place as shown in FIG. 7.

Referring now to FIGS. 1 and 2, the trailer 10 has been loaded with three dirt bikes 90 at the front of vehicle and one large off-the-road 4-wheeler vehicle 92 at the rear of the vehicle. The 4-wheeler 92 is held in place on the floor 12 of the trailer 10 by straps 94 secured on one end to the vehicle frame and on the other end to the clip 80 of the anchoring device 70. The 4-wheeler 92 is connected to the floor 12 at the front and at the rear of the trailer 10, with the strap 94 wrapped around and secured to the frame of the 4-wheeler, both at the front and at the rear thereof.

Figure 8:
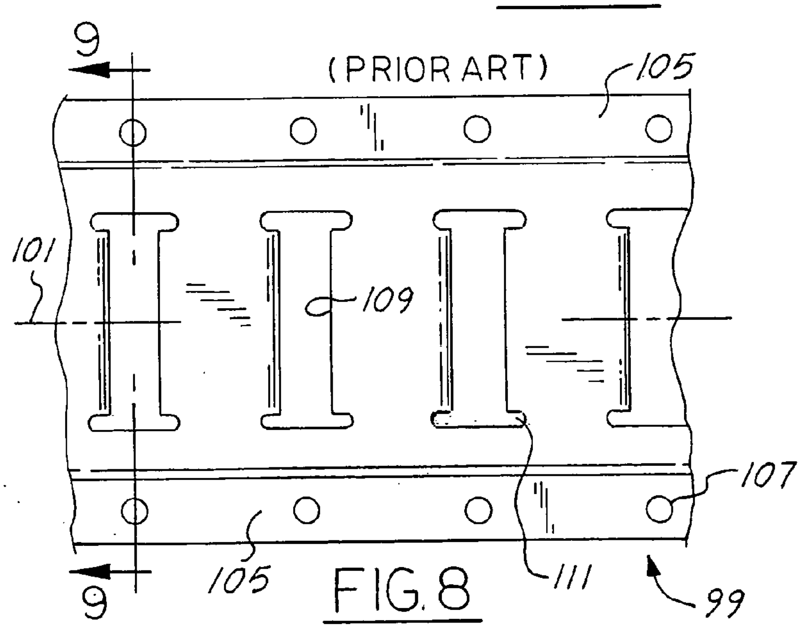
FIG. 8 is a fragmentary plan view of a prior art track, with parts broken away.
Figure 9:
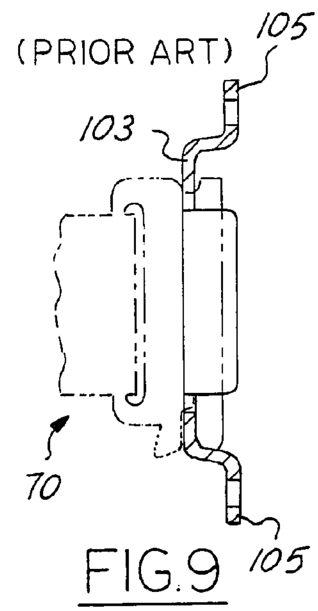
FIG. 9 is a sectional view taken on the line 9—9 of FIG. 8 showing a retainer and strap assembly in an assembled retained position in a slot of the track.

One prior art device is illustrated in FIGS. 8 and 9. The track 99 has a longitudinal axis 101, a raised center section 103, and a pair of laterally outwardly extending flanges 105 with mounting openings 107. The generally rectangular slots 109, with enlarged ends 111 extend laterally across the raised center section 103 between the flanges 105. The strap and anchoring device 70, previously described, extends into a slot 109 as shown in FIG. 9.

With respect to the two wheel dirt bikes 90 illustrated in FIGS. 1 and 2, a pair of stabilizing straps 96 are secured together at opposite sides of the dirt bike 90 to the handle bars 91 on one end of each strap, with the other end of each strap having a hook 98 (FIG. 2) connected to the strap loop 80 of the fastening device 70 which is anchored in the track 24 as illustrated in FIG. 2. The manner in which the fastening device 70 is engaged with the track 24 is illustrated in FIGS. 6 and 7.

Figure 11:
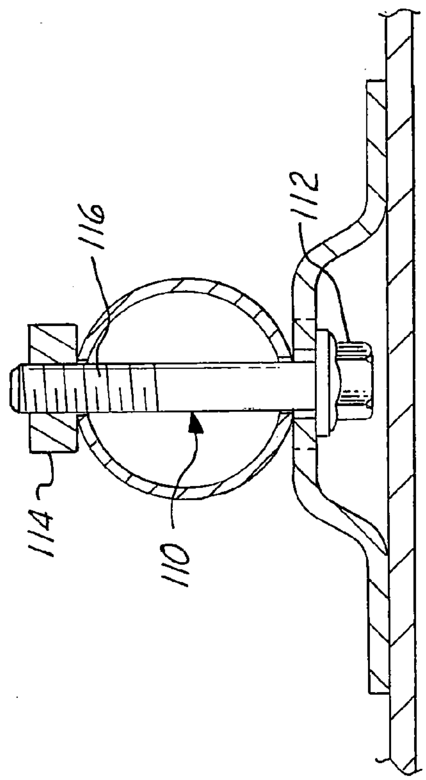
FIG. 11 is a sectional view taken on the line 11—11 of FIG. 10.
Figure 12:
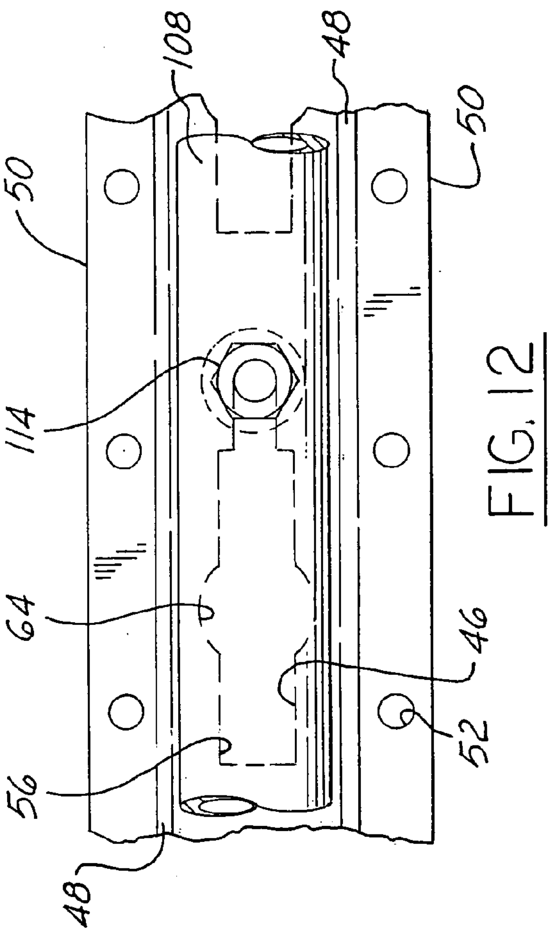
FIG. 12 is a top view of the wheel chock and track looking in the direction of arrow 12 of FIG. 10.
Figure 10:
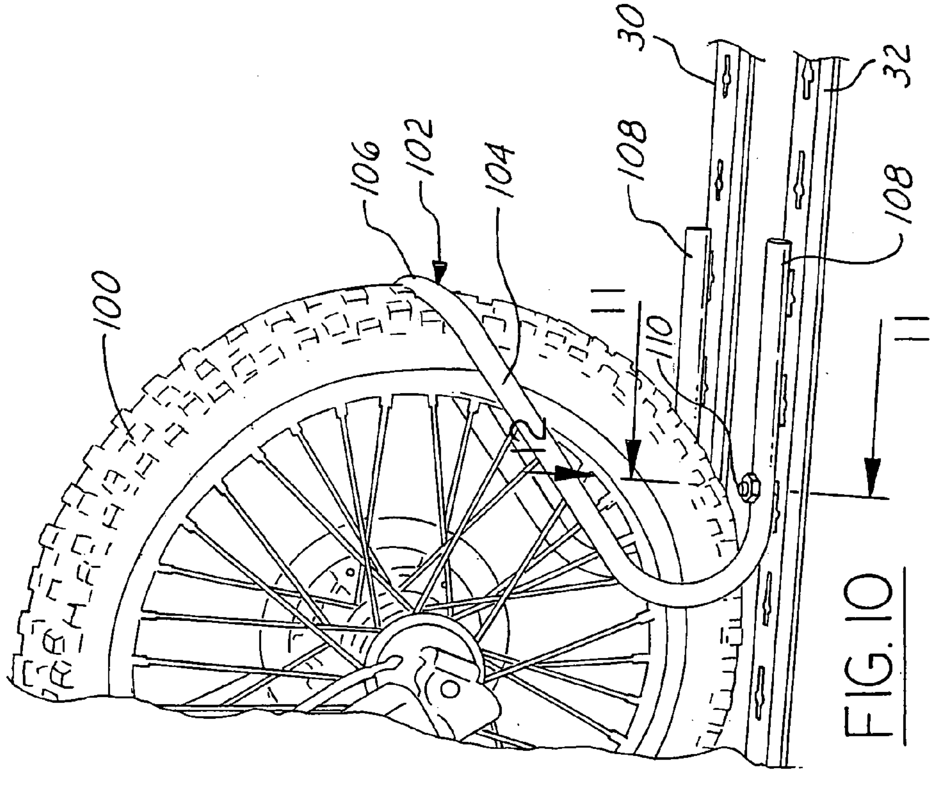
FIG. 10 is a side elevation of a wheel of a dirt bike retained in a wheel chock mounted on a pair of parallel novel tracks.

It also necessary to position the front tire 100 of each dirt bike 90 in place by utilizing a wheel chock 102. Each wheel chock 102 includes a pair of tubular spaced apart sides 104 connected at the top 106 and terminating in a pair of spaced apart legs 108, best illustrated in FIGS. 2 and 10. The legs 108 overlie a pair of parallel tracks, as an example, 30 and 32. Each leg 108 is provided with a threaded bolt 110 (FIGS. 10–12 inclusive). Bolt 110 has a head 112 on one end and a nut 114 on the threaded stem 116. Each head 112 extends into a slot 54, first entering into the slot 54 through the entrance opening 64, then moved into the corresponding slot extension 66 where the bolt 110 engages the pair of parallel longitudinally extending second side walls 68 and the corresponding third end wall 70.

It is contemplated that in certain applications, the threaded bolt 110 may have the nut end 114 inserted into the slot 54 rather than the head end 112 as illustrated in FIGS. 10–12 inclusive.

Figure 13:
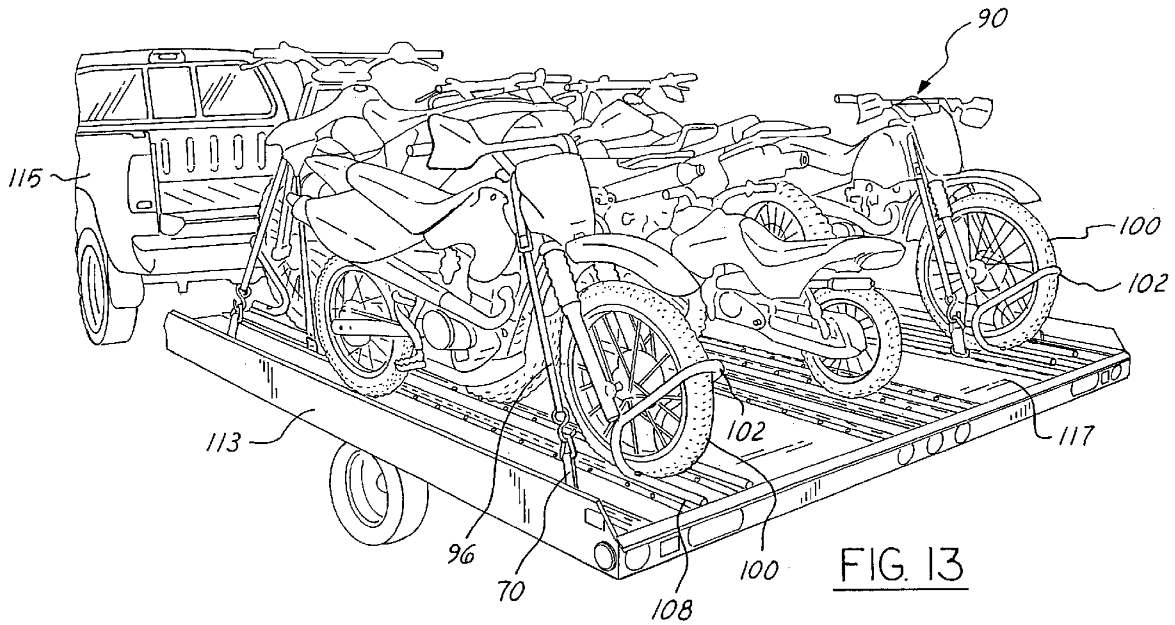
FIG. 13 is a perspective view of a truck and trailer with a plurality of dirt bikes mounted on novel tracks carried by the floor of the trailer, with the dirt bikes retained via wheel chocks and straps to prevent movement and to permit adjustment and/or removal of the wheel chocks to respectively adjust or remove the dirt bikes or to use the trailer for other purposes.

FIG. 13 illustrates an open trailer 113 pulled by a truck 115. The floor 117 of the trailer 113 has a plurality of longitudinally extending unique tracks of the type illustrated in FIGS. 1–4 inclusive. The front wheel 100 of each dirt bike 90 is secured to the novel track by means of straps 96 and fastening devices 70 as described in connection with FIG. 2. In addition, the U-shaped wheel chock 102 is employed around the front tire 100 of the dirt bikes 90, with the legs 108 secured to the slotted track by means of the fastening device illustrated in FIGS. 11 and 12.

Figure 14:
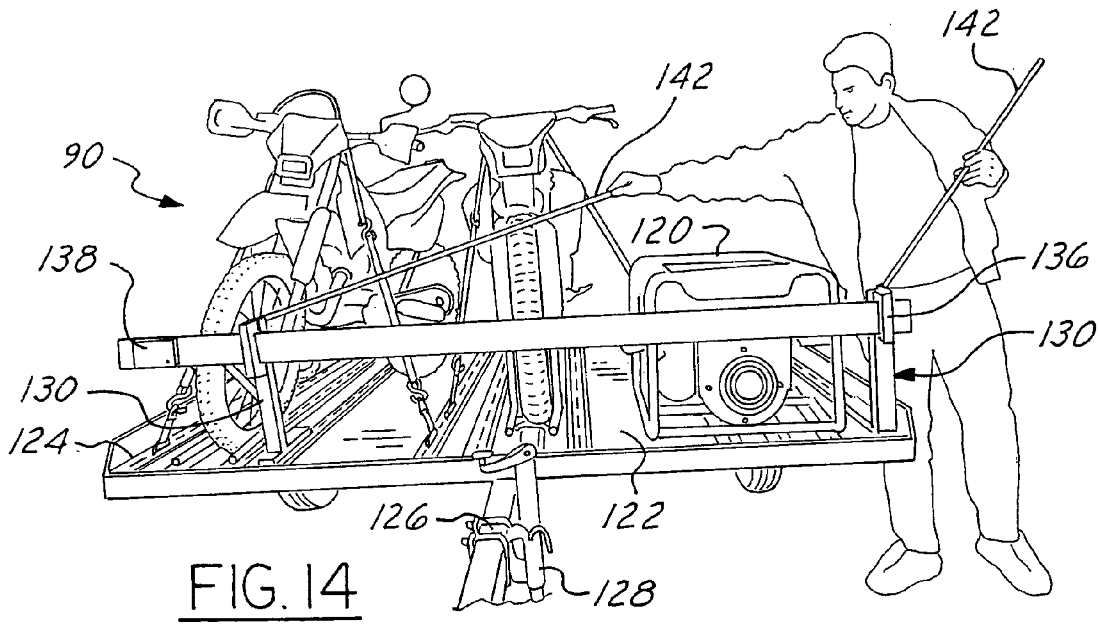
FIG. 14 is a perspective view of the trailer showing two dirt bikes and an engine or generator mounted on the tracks and retained on the trailer by means of wheel chocks and anchoring straps.
Figure 15:
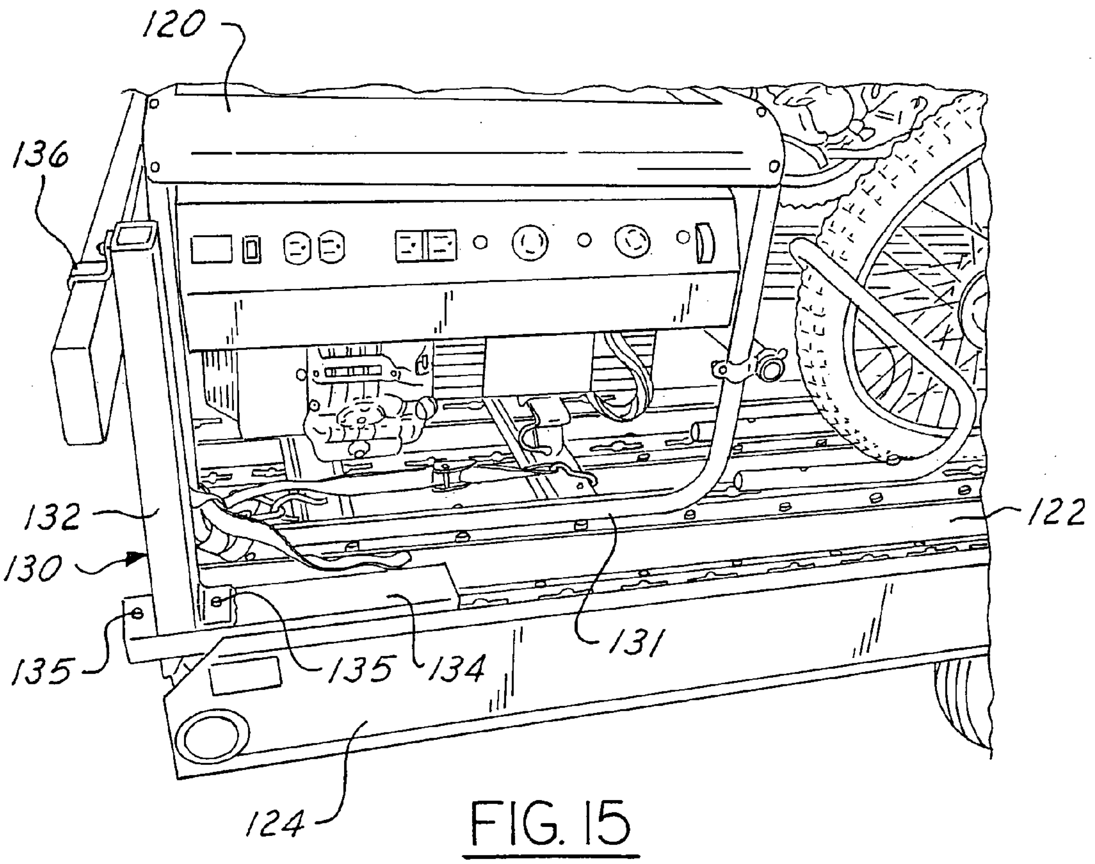
FIG. 15 is a right hand side view of the trailer, engine or generator and dirt bikes as illustrated in FIG. 14.
Figure 16:
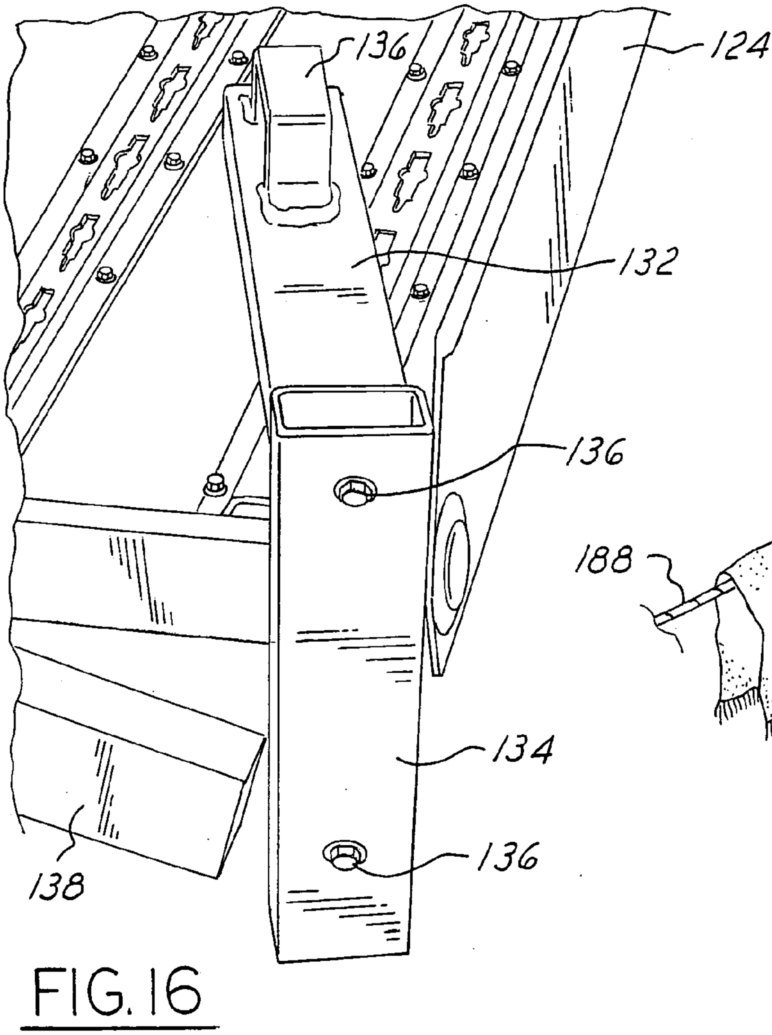
FIG. 16 is a fragmentary perspective view of a pair of longitudinally spaced apart tracks and one of the associated mounting brackets and abutment bar of FIG. 15.
Figure 17:
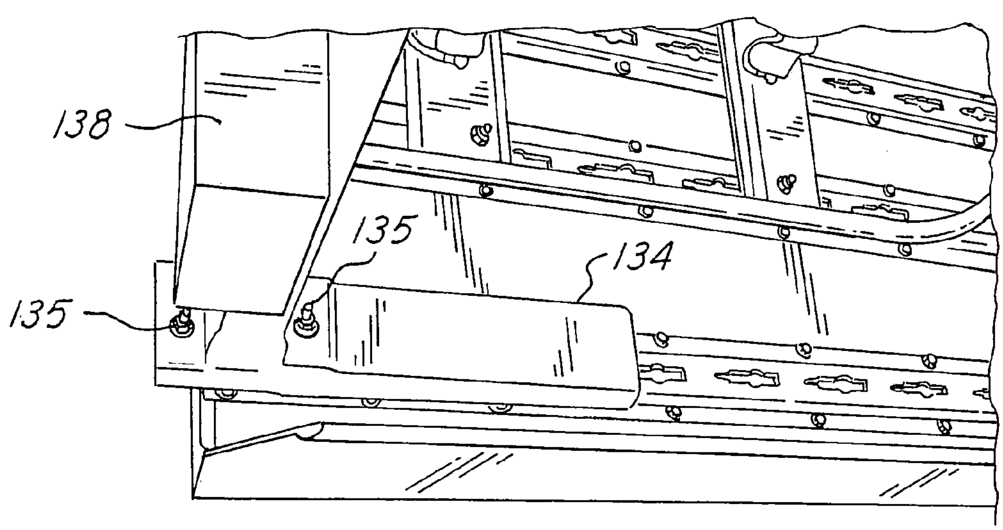
FIG. 17 is a fragmentary perspective view of the tracks and mounting bracket of FIG. 15

FIGS. 14–17 inclusive illustrate another embodiment of the present invention including a way for anchoring the generator 120 to the floor 122 of the trailer 124 provided with a trailer hitch 126 and a leveling mechanism 128. The front end of the trailer 124 is provided on opposite sides thereof with a pair of L-shaped brackets 130. Each bracket 130 consists of an upstanding tubular member or post 132 and a horizontal tubular member or post 134. The inner surfaces of members 132 and 134 are connected by welding or by clips which are bolted at 135 to hold the bracket 130 together. Member 134 is provided with a pair of fastening devices including bolts 136 which are adapted to be received in the slots 56 of the underlying track as illustrated in FIGS. 15 and 17. The upstanding posts 132 of the L-shaped brackets 130 are each provided with a U-shaped strap 136 which is secured to the post 132. The wood 2×4 138 extends through the aligned straps 136 and extend across the front of the generator 120 and the dirt bike 90 (FIG. 14). A person is illustrated in FIG. 14 carrying pointers 142 which are directed to the L-shaped brackets 130. The bracket 134 and the 2×4 member 138 are shown unassembled in FIG. 16.

The generator 120 is held on the floor 122 by straps and anchoring devices 70 which prevent longitudinal and lateral movement of the generator 120. In addition, the opposing tubular rods 131 may be provided with bolts (FIG. 11) which fit into the underlying slots 56 of the adjacent tracks.

Figure 20:
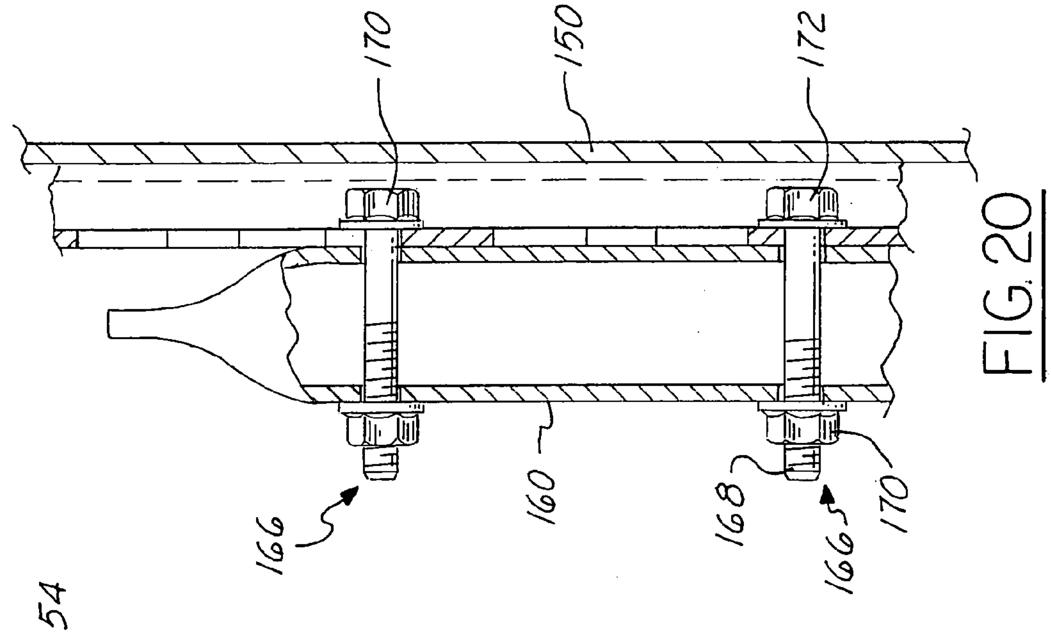
FIG. 20 is a sectional view taken along the line 20—20 of FIG. 19.
Figure 19:
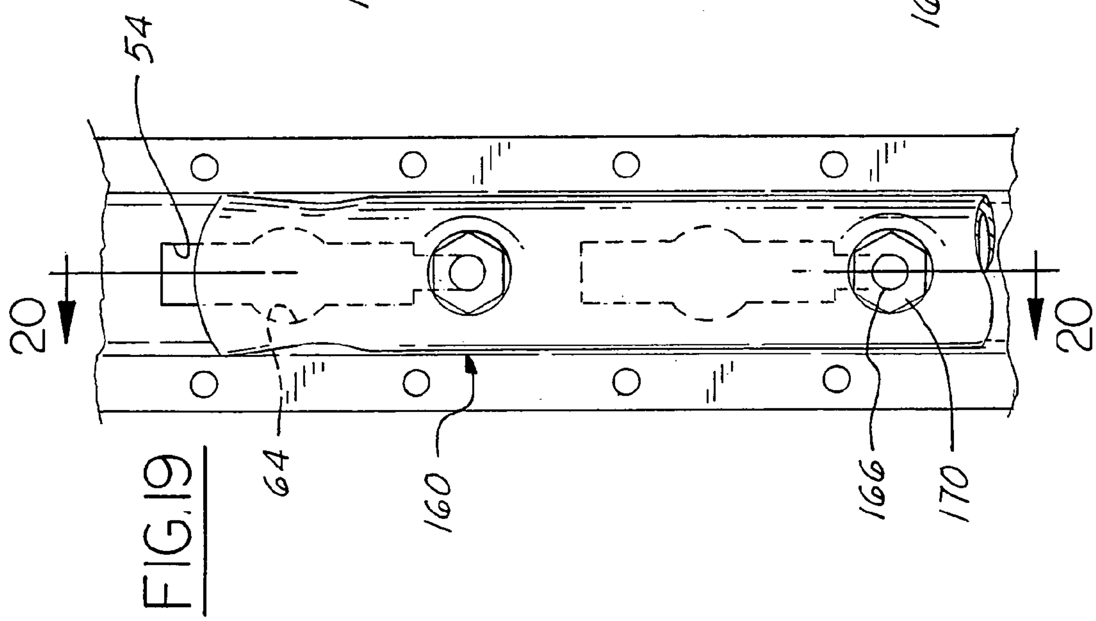
FIG. 19 is a view looking in the direction of arrow 19 of FIG. 18 and illustrating the manner of mounting a bracket to the track.
Figure 18:
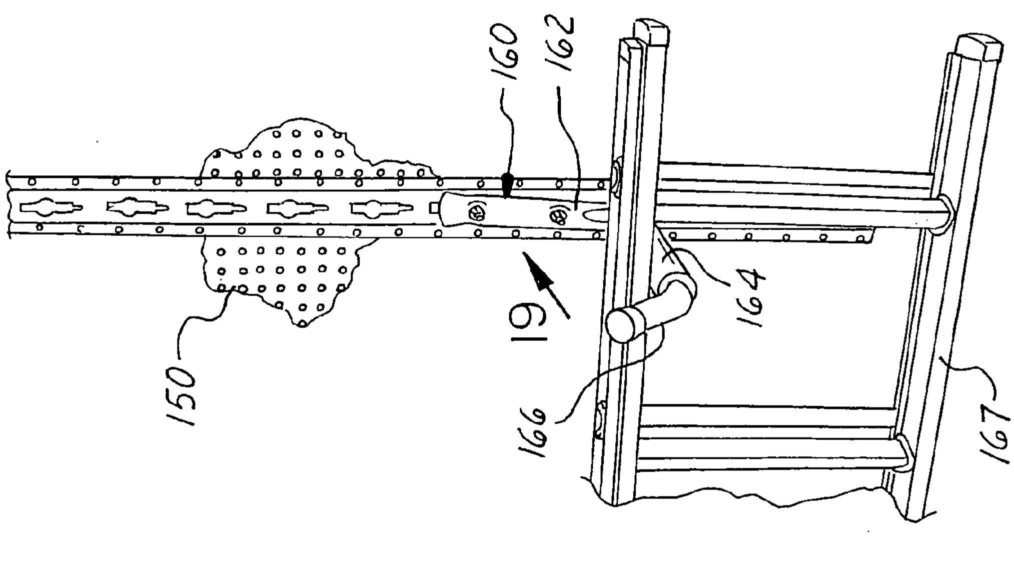
FIG. 18 is a fragmentary vertical elevational view of one of a pair of tracks mounted on a wall, as an example, a garage wall and supporting brackets on which a ladder may be mounted.

The novel track may be used alone or in pairs or groups as explained previously. The tracks may be mounted horizontally as illustrated in FIGS. 1, 13 and 14 or may be mounted vertically as illustrated in FIGS. 18–21 inclusive. The novel track of FIGS. 18–20 is mounted on a vertical wall board 150 of the type utilized in a garage. The track is fastened to the wall board 150. A tubular bracket 160 has a base portion 162 and a support portion 164 extending outwardly from the base 162 as best illustrated in FIG. 18. The support 164 is of L-shaped configuration and has a leg or a retaining element 166 for keeping the ladder 167 or other item on the device 160. The tubular bracket 160 is provided with a pair of bolts 166 having a threaded end 168 upon which is mounted a threaded nut 170 and on the other end of the bolt a head 172. Bracket 160 is mounted on the vertical track by positioning the heads 170 of the bolts into the entrance openings 64 of the slots 54 and thereafter moving the bolts 166 and heads 170 into the rod extensions 66 where the bolts 166 engages the second longitudinal sides 68 of the slots 54 and the bolts 166 engage the third ends 70 of the slots 54.

Figure 21:
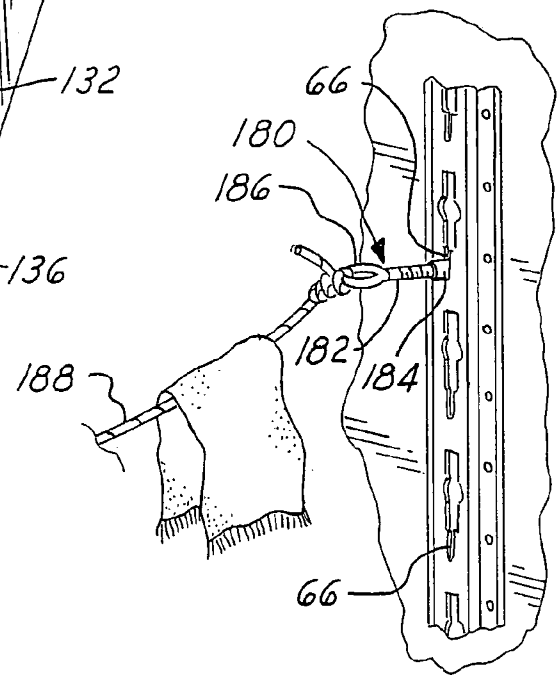
FIG. 21 is a fragmentary perspective view of a vertical support or wall for mounting a track, with the track having a bolt received in the slot formation to which a line or rope is connected.

The novel track may also be mounted vertically on a post or on a wall and positioned so as to cooperative with a vertically spaced apart track similarly mounted as in FIG. 21. An I-bolt 180 having a threaded stem 182 and a nut 184 on one end and a closed loop 186 on the other end. The nut 184 is slid into the entrance opening 64 and thereafter moved into the slot extension 66 as viewed in FIG. 21. A rope or line 188 may be tied to the loop 186 of the bolt 180 and used for supporting clothes or other items to be dried.

What I claim is:

1. A track comprising a unitary elongated body having a longitudinal axis, said body having a raised center section extending along said longitudinal axis from one end to another end, said center section having a flat base with downwardly tapering sides terminating in laterally outwardly extending flanges extending parallel to and spaced from said longitudinal axis from one end of said body to another end, the flat base of said raised center section having a plurality of longitudinally spaced apart slots extending lengthwise along said longitudinal axis, each slot having a pair of longitudinally extending first side walls which are spaced laterally apart, said first side walls of each slot being connected by first and second parallel end walls, an entrance opening of arcuate configuration enlarging said slot between said first and second parallel end walls, and a slot extension intersecting said second end wall and extending lengthwise along said longitudinal axis, said slot extension having a pair of parallel longitudinally extending second side walls terminating in a third end wall which is spaced from said first and second end walls.

2. The track as set forth in claim 1, wherein said second side walls of each slot are closer together than said first side walls.

3. The track as set forth in claim 1, wherein said plurality of longitudinally spaced apart slots are identical.

4. The track as set forth in claim 1, wherein the entrance opening of each slot is generally located midway between said first and second parallel end walls.

5. The track as set forth in claim 1, wherein said flanges are provided with a plurality of longitudinally spaced apart openings for permitting the flanges to be secured by fastening devices to a support.

6. The track as set forth in claim 1, wherein said unitary elongated body is made from a strong metal.

7. The track as set forth in claim 6, wherein said unitary elongated metal body is made from steel.

8. The track as set forth in claim 1, wherein the parallel longitudinally extending second side walls of said slot extension are closer to one another than are the first mentioned pair of longitudinally extending first side walls whereby the second side walls which are closer together are adapted to receive therebetween the shank of a fastening bolt.

9. The track as set forth in claim 8, wherein said third wall is curved to receive and to abut a fastening bolt located adjacent thereto.

10. The track as set forth in claim 1, wherein said elongated body has a length from four feet to eight feet.

11. The combination of a track as set forth in claim 1, and a latch of U-shaped configuration received in one of said slots, said U-shaped latch having one end portion adapted to fit under the first end wall of said one slot and at another end having a portion adapted to fit under said second end wall of said one slot, said latch having a tie down strap connected thereto.

12. The combination of a pair of parallel tracks, each track as set forth in claim 1, and a wheel chock having a pair of spaced apart tubular sides connected at the top and terminating in a pair of spaced apart legs which overlie said parallel tracks, each leg having a threaded bolt extending therethrough, each bolt having a head on one end and nut on a threaded end, with each head extending into one of said slots of the respective track and moved into the corresponding slot extension where the bolt engages the respective pair of parallel longitudinal extending second side walls and the corresponding third end wall.

13. The combination of the track as set forth in claim 1, and a threaded bolt having on one end a head adapted to fit into the slot extension of one of said slots and on the other end a hook to which a rope or a line may be connected.

14. The combination of the track as set forth in claim 1, and a threaded bolt having on one end a head adapted to fit into the slot extension of one of said slots and on the other end a closed loop to which a rope or a line may be connected.

15. The combination of a track as set forth in claim 1, and a tubular element which overlies said track, a threaded bolt extending through said tubular element having a head end and a nut end, with either of said bolt ends extending into one of said slots of said track and moved into the corresponding slot extension where the bolt engages the pair of parallel longitudinal extending second side walls and the corresponding third end wall.

16. The combination as set forth in claim 14, wherein the head end of said bolt is located in said slot extension.

17. The combination as set forth in claim 14, wherein a nut end of said bolt is located in said slot extension.

* * * * *